United States Patent [19]

Steffan et al.

[11] Patent Number: 5,405,424
[45] Date of Patent: Apr. 11, 1995

[54] SERVO CONTROLLED GLASS GOB DISTRIBUTOR

[75] Inventors: Leonard D. Steffan; D. Wayne Leidy, both of Perrysburg, Ohio

[73] Assignee: Owens-Brockway Glass Container Inc., Toledo, Ohio

[21] Appl. No.: 66,189

[22] Filed: May 24, 1993

[51] Int. Cl.6 .................... C03B 7/16; B65G 11/12
[52] U.S. Cl. .......................... 65/158; 65/160; 65/164; 65/225; 65/304; 193/22
[58] Field of Search .............. 65/158, 160, 164, 163, 65/207, 225, 221, 222, 304, DIG. 13; 193/22, 2 R, 23

[56] References Cited

U.S. PATENT DOCUMENTS

| Re. 28,073 | 7/1974 | Trudeau | 65/225 |
|---|---|---|---|
| Re. 28,759 | 4/1976 | Bystrianyk et al. | 65/225 |
| 1,843,159 | 2/1932 | Ingle . | |
| 2,859,559 | 11/1958 | Mumford . | |
| 2,926,457 | 3/1960 | Trudeau . | |
| 2,944,648 | 7/1960 | Haines . | |
| 3,142,552 | 7/1964 | Martin . | |
| 3,189,178 | 6/1965 | Calleson et al. . | |
| 3,235,352 | 2/1966 | Hackett . | |
| 3,333,938 | 8/1967 | Zappia . | |
| 3,585,017 | 6/1971 | Trudeau . | |
| 3,592,624 | 7/1971 | Dahms . | |
| 3,597,187 | 8/1971 | Trudeau . | |
| 4,007,028 | 2/1977 | Bublitz et al. | 65/164 |
| 4,105,428 | 8/1978 | Adams . | |
| 4,145,204 | 3/1979 | Farkas et al. | 65/164 |
| 4,339,258 | 7/1982 | Martin . | |
| 4,357,157 | 11/1982 | Cardenas-Franco et al. | 65/164 |
| 4,357,158 | 11/1982 | Garza . | |
| 4,402,721 | 9/1983 | Ericson et al. | 65/164 |
| 4,453,963 | 6/1984 | Larson et al. | 65/164 |
| 4,459,146 | 7/1984 | Farkas et al. | 65/164 |
| 4,469,501 | 9/1984 | Kingsbury et al. | 65/164 |
| 4,529,431 | 7/1985 | Mumford | 65/225 |
| 4,531,961 | 7/1985 | Hileman et al. | 65/225 |
| 4,599,101 | 7/1986 | Douglas et al. . | |
| 4,608,074 | 8/1986 | Knoth et al. | 65/164 |
| 4,636,238 | 1/1987 | Sidler | 65/DIG. 13 |
| 4,723,977 | 2/1988 | Grant et al. | 65/DIG. 13 |
| 4,793,846 | 12/1988 | Peterson | 65/DIG. 13 |
| 4,793,847 | 12/1988 | Kawachi et al. | 65/225 |
| 5,135,559 | 8/1992 | Sasso et al. | 65/225 |
| 5,271,756 | 12/1993 | Peterson et al. | 65/225 |

Primary Examiner—W. Gary Jones
Assistant Examiner—Steven P. Griffin

[57] ABSTRACT

A molten glass gob distributor for a glass container manufacturing system that includes a plurality of gob discharges and a plurality of scoops for receiving gobs from each such discharge and distributing the gobs among a plurality of troughs leading to associated molds in an IS machine. Each scoop is mounted to rotate about a fixed axis with the upper end remaining positioned beneath the associated gob discharge while the lower end swings through an arc adjacent to the associated troughs. A plurality of electric servo motors are individually coupled to each associated scoop for selectively and individually rotating the scoops. The electric motors are connected to servo motor controllers for synchronizing operation of the motors and rotation of the scoops to each other and to operation of the forming machine. The motor controllers synchronize operation of each motor by means of a synchronizing input from the forming machine.

3 Claims, 2 Drawing Sheets

SERVO CONTROLLED GLASS GOB DISTRIBUTOR

The present invention is directed to manufacture of glass articles such as containers, and more particularly to an improved method and apparatus for distributing gobs of molten glass among a plurality of mold stations or sections.

BACKGROUND AND SUMMARY OF THE INVENTION

Glass containers are conventionally formed in a machine that comprises a plurality of sections, in each of which there are one or more blank or parison mold cavities and transfer mechanisms that are synchronized with each other. This machine, called an individual section or IS machine, receives glass in the form of discrete mold charges or gobs. Molten glass from a furnace is cut into individual gobs, which are fed to a gob distributor. The purpose of the gob distributor is to distribute the gobs to the individual sections of the IS machine in the appropriate sequence in such a way at the glass gobs simultaneously arrive at the mold cavities in each section in sequence. U.S. Pat. Nos. 3,585,017 and 3,597,187, and patents noted therein, illustrate the general technology.

U.S. Pat. No. 2,859,559 discloses a gob distributor construction in which a scoop is disposed beneath a gob shear mechanism for receiving molten gobs in sequence, and is coupled by a shaft to a motor for feeding the individual gobs to spaced chutes or troughs. Each trough leads to the initial mold cavity of an associated section of an IS machine. Each cavity of the IS machine has an associated trough, and the scoop feeds gobs to the individual troughs in an appropriate sequence. U.S. Pat. No. 3,597,187 discloses a gob distributor in which a plurality of scoops each have an upper end disposed beneath an associated gob discharge, and a lower end disposed to swing through an arc adjacent to a corresponding plurality of troughs. Each scoop is carried by a Scoop support frame, which is in turn is coupled to a drive shaft. The multiple drive shafts are coupled to a gear transmission drive, in which the shafts are conjointly driven through associated gears by a single motor. Although this transmission drive arrangement maintains proper synchronism among the scoops, a problem arises when it is desired to change the number of scoops. An entirely new transmission drive is required.

A general object of the present invention is to provide a glass gob distribution system and method in which gob distribution scoops may be readily added, deleted or inactivated without requiring redesign or replacement of the entire scoop drive structure. Another and more specific object of the present invention is to provide a glass gob distribution system and method for a multiple-cavity IS machine in which the scoop for each cavity is mechanically independent from the scoops for the other cavities, and in which scoop position and motion profile may be readily electronically adjusted independently of the other scoops of the distribution system.

A molten glass gob distributor for a glass article manufacturing system in accordance with the present invention includes a plurality of gob discharges, and a plurality of scoops for receiving gobs from each such discharge and distributing the gobs among a plurality of troughs or chutes leading to associated molds in a multiple-cavity IS machine. Each scoop is mounted to rotate about a fixed axis with the upper end remaining positioned beneath the associated gob discharge while the lower end swings through an arc adjacent to the associated troughs. A plurality of electric motors are individually coupled to each associated scoop for selectively and individually rotating the scoops. The electric motors are all connected to a motor controller for synchronizing operation of the motors and rotation of the scoops to each other and to operation of the forming machine. Preferably, the motors comprise electric servo motors each individually coupled to a single associated scoop, and the motor controller comprises an electronic servo motor controller operatively coupled to each servo motor and synchronizing operation thereof by means of a synchronizing input from the forming machine.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENT

Figure 1:
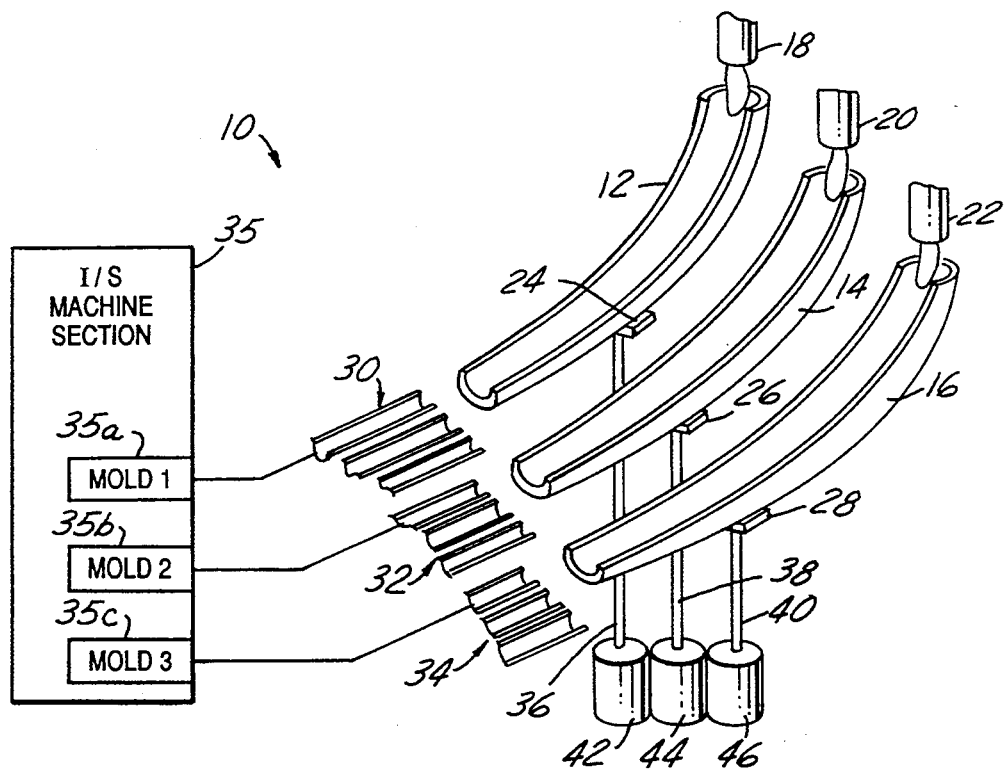
FIG. 1 is a fragmentary perspective view that illustrates a molten glass gob distribution system in accordance with one presently preferred embodiment of the invention.

FIG. 1 illustrates a gob distribution system 10 in accordance with one presently preferred embodiment of the invention as comprising three arcuate scoops 12,14,16 each having an upper end positioned beneath an associated glass gob discharge orifice 18,20,22. Each SCOOP 12,14,16 is carried by an associated support bracket or frame 24,26,28 to rotate through an arc about a fixed axis such that the upper end of each scoop remains positioned beneath the associated gob discharge orifice, while the lower end of each scoop swings through an arc adjacent to an associated array of troughs or chutes 30,32,34. The number of troughs in each array 30,32,34 is determined by the number of sections 35 in the IS machine. The number of scoops 12,14,16, the number of orifices 18,20,22 and the number of trough arrays 30,32,34 are all determined by the number of molds or cavities in each section 35 of the IS machine. For example, three gob orifices, scoops and chute arrays are illustrated in FIG. 1 for use in connection with a so-called triple-cavity IS machine in which each section 35 includes three parison molds 35a,35b and 35c. A typical IS machine may include eight such machine sections 35, so that each chute array 30,32,34 would include eight individual chutes positioned for alignment with the corresponding scoop 12,14,16, of which only three chutes are illustrated in FIG. 1 for purposes of clarity. The general purpose of gob distribution system 10 is to deliver glass mold charges or gobs to the three molds 35a,35b,35c simultaneously for each machine section 35 in sequence. To the extent thus far described, system 10 is of generally conventional construction.

In accordance with the present invention, each of the scoop supports 24,26,28 is coupled by an associated drive shaft 36,38,40 to a gear box 42,44,46 (FIGS. 1 and 2) driven by an associated electric servo motor 48,50,52. Each servo motor 48,50,52 receives drive signals from a corresponding servo amplifier 54,56,58 under control of an associated motion controller 60,62,64. A first position sensor R1, such as a conventional resolver, is coupled to each servo motor 48,50,52 for providing to the associated motion controller 60,62,64, an electrical signal indicative of angular position of the associated motor drive shaft. A second position sensor R2, such as a conventional a resolver, is coupled to each gear box 42,44,46 for providing to the associated motion controller 60,62,64 a second electrical signal indicative of absolute position of the associated scoop 12,14,16. The several motion controllers 60,62,64 are coupled by a communications link 66 to a supervisory controller 68. Supervisory controller 68 receives a synchronizing input from an infrared sensor 70 positioned adjacent to a selected one of the gob orifices 18,20,22 (FIG. 1) to provide a corresponding signal when a glass gob is discharged from the orifice. Supervisory controller 68 is also connected to an operator interface 72, such as a keyboard and screen, for receiving calibration and adjustment inputs, etc., and providing output for display to a machine operator. Supervisory controller 68 and motion controllers 60,62,64 also receive synchronizing master clock and master reset inputs from IS machine 35.

Figure 3:
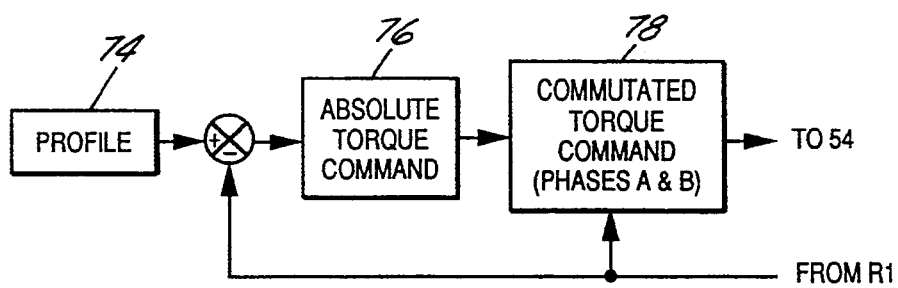
FIG. 3 is a functional block diagram of each motion controller illustrated in FIG. 2.
Figure 4:
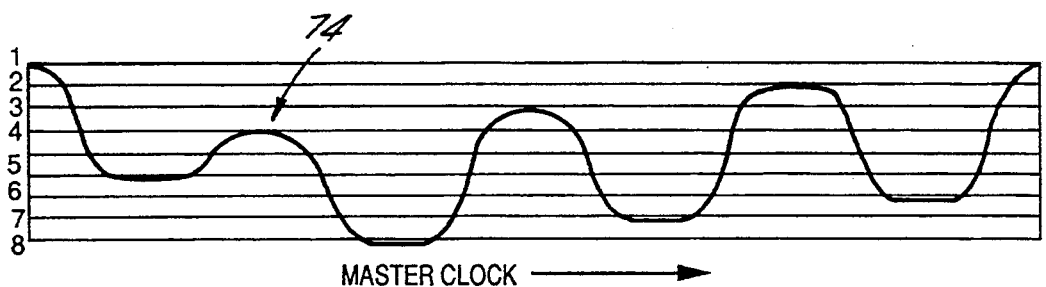
FIG. 4 is a graphic illustration of motion profile for each scoop, illustrating sequence of delivery or mold charges or gobs to the eight sections of an IS machine.

In operation, each motion controller 60,62,64 receives from supervisory controller 68 and stores in internal memory a table of data indicative desired position profile 74 (FIGS. 3 and 4) at the associated scoop. For example, FIG. 4 illustrates a profile 74 for an eight-section machine in which each scoop is cycled through chute positions 1,5,4,8,3,7,2 and 6 in a continuing sequence for distributing glass gobs simultaneously to the three parison molds of each machine section in that sequence. Within each motion controller 60,62,64, the profile 74 for the associated scoop is compared to the position feedback from the associated resolver R1, with the difference or error generating an absolute torque command 76 (FIG. 3). This torque command is commutated at 78 for power phases A and B applied to the associated amplifier 54 (or 56 or 58). The torque command for the third phase is calculated in the associated amplifier as the sum of the torque commands for the first and second phases. These torque commands are applied by the amplifier to the associated servo motor to drive the gear box and scoop to the desired scoop position.

The resolvers R2 indicate absolute position for each scoop. This position information is employed during system initialization to determine actual position of each scoop, which is fed to supervisory controller 68. The supervisory controller may then command each motion controller to move its associated scoop to a defined initial or "home" position. After this initialization sequence, the absolute position output of resolvers R2 may be monitored periodically to correct any drift in scoop position.

Figure 2:
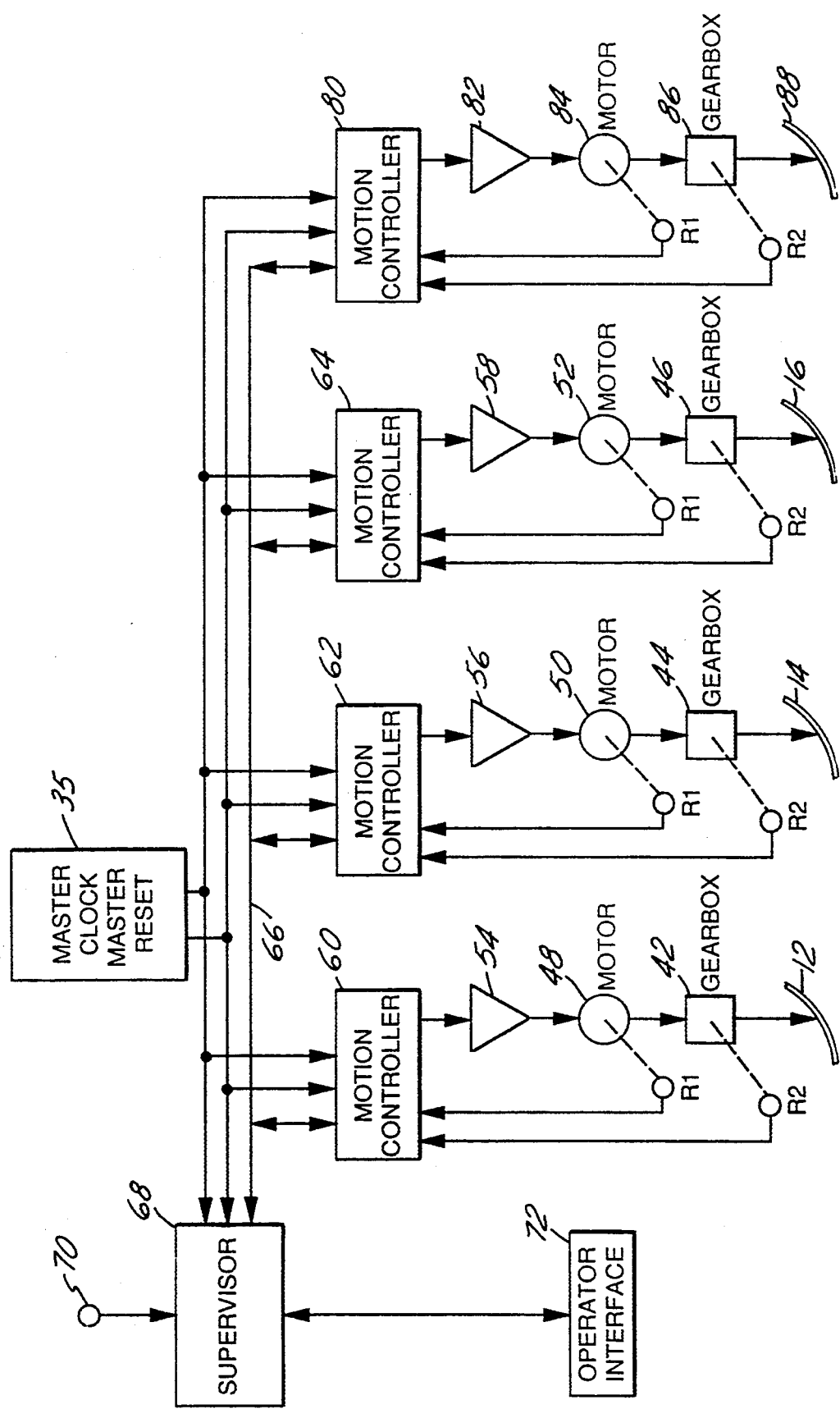
FIG. 2 is a functional block diagram of the gob distribution system illustrated in FIG. 1.

It will be readily appreciated that the electric motor and motor control gob distribution system 10 illustrated in the drawings represents a distinct advantage over the prior art gear transmission drive arrangements discussed above. The several scoops 12,14,16 are mechanically completely independent of each other, so that position of each scoop may be calibrated and controlled completely independently of all other scoops. For example, position of scoop 12 at any point in its profile 74 may be readily adjusted by means of operator interface 72, supervisory controller 68 and motion controller 60 without in any way affecting motion or position at any of the other scoops. Motion and profile of each scoop may be adjusted during system operation. Scoops may be added, deleted or simply rendered inoperative by addition or deletion of associated servo motors and motion controllers etc. without requiring complete replacement or major rework of a gear drive transmission. For example, FIG. 2 illustrates addition of a fourth motion controller 80 with associated amplifier 82, motor 84, gear box 86 and scoop 88.

If the overall speed of the glass forming machine must be increased, supervisory controller 68 may automatically reduce the allowable time for motion of the various scoops, and adjust the motion profiles accordingly so that the dwell times during which each scoop is aligned with a chute remains constant. The same profile 74 would normally be used for each scoop, but a unique profile that accommodates unique design considerations or minor dimensional variations between or among chutes may be readily accommodated. The scoops would normally be synchronized to operate at the same time, moving into and out of position at the same time. However, here again differences may be readily accommodated by electronic adjustment because each scoop is electronically controlled independently of the other scoops. Scoop positions may be determined and set during installation by moving the scoops into alignment with each of the troughs in turn and storing the corresponding position information in memory. The master clock and master reset signals from IS machine 35 are employed for primary synchronization purposes, with infrared sensor 70 providing back-up.

We claim:

1. In a molten glass gob distributor that includes a plurality of gob discharge means, and means for receiving gobs from each of said discharge means and distributing said gobs among a plurality of article forming means in a glass article manufacturing system, said receiving and distributing means comprising: a plurality of scoops each having an upper end disposed beneath an associated discharge means and a lower end, means mounting each said scoop to rotate about a fixed axis such that said upper end remains positioned beneath the associated said discharge means and the lower end swings through an arc, a plurality of electric motors each coupled to an associated one of said mounting means for selectively and individually rotating said scoops, and a plurality of motor control means each coupled to an associated one of said plurality of motors for synchronizing operation of said motors and rotation of said scoops to operation of said forming means, the improvement wherein each of said motors comprises a three-phase servo motor, and wherein each of said motor control means comprises means for generating a varying signal indicative of desired position of the associated scoop, a first sensor coupled to the associated motor for providing a signal indicative of actual position of said motor, means for generating a command signal for the associated motor as a function of a difference between the associated desired and actual position signals, means for applying said command signal as first and second torque commands to two phases of the associated said motor, and means for applying a third torque command to the third phase of the associated said motor as a function of the sum of said first and second torque commands.

2. The distributor set forth in claim 1 further comprising a gear box operatively coupling each said motor to the associated scoop, each said first sensor being coupled to the associated said scoop through said gear box.

3. The distributor set forth in claim 2 wherein each said motor control means further comprises a second sensor for providing a signal indicative of actual position of the associated scoop, and means responsive to said second sensor to correct any drift in position of said associated scoop.

* * * * *